United States Patent
Boe et al.

(10) Patent No.: US 11,407,298 B1
(45) Date of Patent: Aug. 9, 2022

(54) REMOVABLE BATTERY UNIT FOR AN ELECTRIC VEHICLE

(71) Applicant: One3 Design, Inc., Cedar Falls, IA (US)

(72) Inventors: Thomas Cedric Boe, Cedar Falls, IA (US); Zach Kooistra, Cedar Falls, IA (US); Kyle Boe, Cedar Falls, IA (US); Terry Zwart, Loveland, CO (US); Louis Macuch, Waynesboro, GA (US); Broc Ducharme, Harlem, GA (US); Danielle Stalcup, Elberton, GA (US)

(73) Assignee: AMOS POWER, INC., Cedar Falls, IA (US)

( * ) Notice: Subject to any disclaimer, the term of this patent is extended or adjusted under 35 U.S.C. 154(b) by 0 days.

(21) Appl. No.: 17/526,872

(22) Filed: Nov. 15, 2021

(51) Int. Cl.
    *B60K 1/04* (2019.01)
    *B62D 55/065* (2006.01)
    *B60L 53/16* (2019.01)
    *B62D 25/10* (2006.01)

(52) U.S. Cl.
    CPC .............. *B60K 1/04* (2013.01); *B60L 53/16* (2019.02); *B62D 25/10* (2013.01); *B62D 55/065* (2013.01); *B60K 2001/0411* (2013.01); *B60K 2001/0483* (2013.01)

(58) Field of Classification Search
    CPC .............. B60K 1/04; B60K 2001/0411; B60K 2001/0483; B60L 53/16; B62D 25/10; B62D 55/065
    See application file for complete search history.

(56) References Cited

U.S. PATENT DOCUMENTS

| | | |
|---|---|---|
| 4,060,310 A | 11/1977 | Brown |
| 4,326,549 A | 4/1982 | Hinding |
| 4,541,051 A | 9/1985 | Jarret |
| 4,873,475 A | 10/1989 | Togo |
| 5,035,158 A | 7/1991 | Leigh-Monstevens |
| 5,101,922 A | 4/1992 | Ohmura |
| 5,301,765 A * | 4/1994 | Swanson ................ B60L 8/00 180/68.5 |
| 5,360,307 A * | 11/1994 | Schemm ................ B60L 53/80 414/343 |
| 5,365,283 A | 11/1994 | Doherty |

(Continued)

FOREIGN PATENT DOCUMENTS

| | | |
|---|---|---|
| WO | 2020106142 | 5/2020 |
| WO | 2020106143 | 5/2020 |

(Continued)

OTHER PUBLICATIONS www.ztractor.com—Print screen dated Nov. 15, 2021, ZIRACTOR, Palo Alto, CA.

(Continued)

*Primary Examiner* — Tony H Winner
*Assistant Examiner* — Michael R Stabley
(74) *Attorney, Agent, or Firm* — Shuttleworth & Ingersoll, PLC; Jason R. Sytsma

(57) ABSTRACT

A robotic vehicle comprising a chassis, a right track assembly and a left track assembly for supporting the chassis, and a battery unit comprising a front portion and a back portion with a center of gravity at the front portion. The battery unit is configured for connection to the chassis with the center of gravity forward of the chassis.

20 Claims, 12 Drawing Sheets

(56) References Cited

U.S. PATENT DOCUMENTS

| | | | |
|---|---|---|---|
| 5,456,333 A | 10/1995 | Brandt | |
| 5,492,192 A | 2/1996 | Brooks | |
| 5,529,028 A | 6/1996 | Weikert | |
| 5,652,487 A | 7/1997 | Nishino | |
| 5,657,099 A | 8/1997 | Gordon | |
| 5,751,579 A | 5/1998 | Hrovat | |
| 5,951,115 A | 9/1999 | Sakai | |
| 6,108,193 A | 8/2000 | Haberstroh | |
| 6,119,802 A | 9/2000 | Puett | |
| 6,154,702 A | 11/2000 | Fodor | |
| 6,219,607 B1 | 4/2001 | Piepenbrink | |
| 6,250,409 B1* | 6/2001 | Wells | A61G 5/061 180/6.5 |
| 6,298,941 B1 | 10/2001 | Spadafora | |
| 6,305,506 B1 | 10/2001 | Shirai | |
| 6,577,025 B2 | 6/2003 | Hentschel | |
| 6,717,281 B1 | 4/2004 | Brandon | |
| 6,727,669 B2 | 4/2004 | Suzuki | |
| 6,874,592 B2 | 4/2005 | Yokotani | |
| 6,978,856 B2 | 12/2005 | Nakamura | |
| 7,032,981 B2 | 4/2006 | Frey | |
| 7,104,364 B2 | 9/2006 | Godlewsky | |
| 7,185,745 B2 | 3/2007 | Godlewsky | |
| 7,201,384 B2 | 4/2007 | Chaney | |
| 7,347,803 B2 | 3/2008 | Kobayashi | |
| 7,351,182 B2 | 4/2008 | Kobayashi | |
| 7,828,099 B2* | 11/2010 | Heckeroth | B60K 16/00 180/68.5 |
| 7,902,987 B2 | 3/2011 | Lemasson | |
| 7,954,960 B2 | 6/2011 | Shirai | |
| 8,083,245 B2 | 12/2011 | Hatzikakidis | |
| 8,193,650 B2 | 6/2012 | Thorne | |
| 8,197,077 B2 | 6/2012 | Brouwer | |
| 8,246,120 B2 | 8/2012 | Bourqui | |
| 8,288,979 B2 | 10/2012 | Bates | |
| 8,327,960 B2* | 12/2012 | Couture | B62D 55/075 180/9.1 |
| 8,413,752 B2 | 4/2013 | Page | |
| 8,466,578 B2 | 6/2013 | Ackert | |
| 8,467,929 B2 | 6/2013 | Bechtler | |
| 8,494,699 B2 | 7/2013 | Bourqui | |
| 8,500,289 B2 | 8/2013 | Shibasaki | |
| 8,684,115 B2 | 4/2014 | Bryant | |
| 8,714,292 B1 | 5/2014 | Wong | |
| 8,717,156 B2 | 5/2014 | Tronnier | |
| 9,061,592 B2 | 6/2015 | Meng | |
| 9,061,680 B2 | 6/2015 | Dalum | |
| 9,085,302 B2 | 7/2015 | Borroni-Bird | |
| 9,199,609 B2 | 12/2015 | Rasal | |
| 9,221,451 B2 | 12/2015 | Ahn | |
| 9,302,667 B2 | 4/2016 | Tassinger | |
| 9,308,964 B2 | 4/2016 | Saida | |
| 9,481,263 B2 | 11/2016 | Ebert | |
| 9,561,767 B2 | 2/2017 | Darraba | |
| 9,561,779 B2 | 2/2017 | Rasal | |
| 9,615,497 B2 | 4/2017 | Bassett | |
| 9,711,767 B2* | 7/2017 | Juenger | H01M 50/20 |
| 9,947,148 B2 | 4/2018 | Moellmann | |
| 10,029,571 B2 | 7/2018 | Ito | |
| 10,093,308 B2 | 10/2018 | Sugai | |
| 10,104,824 B2 | 10/2018 | Blackwell | |
| 10,112,471 B2* | 10/2018 | Higuchi | B60K 7/0007 |
| 10,259,498 B2 | 4/2019 | Jagenstedt | |
| 10,322,769 B2 | 6/2019 | Tanaka | |
| 10,379,532 B2 | 8/2019 | Cameron | |
| 10,458,402 B2 | 10/2019 | Yan | |
| 10,466,699 B2* | 11/2019 | Hirata | G05D 1/0088 |
| 10,562,381 B2 | 2/2020 | Haubs | |
| 10,562,400 B2 | 2/2020 | Ryu | |
| 10,589,738 B1 | 3/2020 | Boecker | |
| 10,659,707 B2 | 5/2020 | Oka | |
| 10,734,878 B2 | 8/2020 | Kim | |
| 10,788,043 B2 | 9/2020 | He | |
| 10,793,084 B2 | 10/2020 | Jiang | |
| 10,814,889 B2 | 10/2020 | Looney | |
| 10,858,041 B2 | 12/2020 | Jagenstedt | |
| 10,946,856 B2 | 3/2021 | Oyama | |
| 10,980,173 B2 | 4/2021 | Becke | |
| 11,021,158 B2 | 6/2021 | Mueller | |
| 2007/0012496 A1* | 1/2007 | Chene | B60L 50/66 180/68.5 |
| 2007/0029117 A1* | 2/2007 | Goldenberg | B62D 55/075 180/9.32 |
| 2015/0105965 A1 | 4/2015 | Blackwell | |
| 2016/0334801 A1* | 11/2016 | Ratanaphanyarat | G05D 1/0246 |
| 2021/0223772 A1 | 7/2021 | Penmetsa | |

FOREIGN PATENT DOCUMENTS

| | | |
|---|---|---|
| WO | 2020152123 | 7/2020 |
| WO | 2021146478 | 7/2021 |
| WO | 2021146493 | 7/2021 |
| WO | 2021146510 | 7/2021 |

OTHER PUBLICATIONS www.AgXeed.com—Print screen dated Nov. 15, 2021, AgXeed, Oirlo, The Netherlands.
https://www.monarchtractor.com/mkv.html—Print screen dated Nov. 15, 2021, Zimeno Inc dba Monarch Tractor, Livermore, CA.
https://i.ytimg.com/vi/qcYR2XaD0UA/maxresdefault.jpg—photo of AgXeed tractor.

* cited by examiner

REMOVABLE BATTERY UNIT FOR AN ELECTRIC VEHICLE

TECHNICAL FIELD

This invention relates to autonomous vehicles, more specifically, the chassis design and battery placement for an autonomous, electric vehicle.

BACKGROUND INFORMATION

There are many instances where autonomous vehicles are preferred to human-operated vehicles. Such autonomous vehicles are particularly advantageous for performing dangerous tasks or operating in hazardous conditions, akin to what first responders, or explosive ordinance disposal teams may experience. They are also favorable in situations where large fleets are needed, such as in agriculture, where farms have increased in size but the limited window of time for agricultural operations remains the same. No matter the situation, personnel need autonomous vehicles that are readily available and robust enough to operate in all conditions.

Therefore, there is a need in the art for a method, system, and/or apparatus that can aid persons in completing various operations. The method, system, and/or apparatus can be used to reduce the time for completing operations, improve the conditions in which an operation can be completed, reduce the amount of manpower needed, or otherwise reduce the number of issues associated with farming and other industries.

SUMMARY

In accordance with one aspect of the present invention, disclosed is a robotic vehicle comprising a chassis, a right track assembly and a left track assembly for supporting the chassis, and a battery unit comprising a front portion and a back portion with a center of gravity at the front portion. The battery unit is configured for connection to the chassis with the center of gravity forward of the chassis.

In an embodiment, a vertical anchor can be combined to the chassis for attachment to the battery unit such that the battery unit is cantilevered to the chassis with the center of gravity forward of the chassis. A lateral anchor can be combined to the chassis for attachment to the battery unit to restrict lateral movement of the battery unit with respect to the chassis. For ease of installation, the chassis can comprise of a battery receiver with a support shelf between the right track assembly and the left track assembly for supporting a back portion of the battery unit with the center of gravity of the battery unit forward of the support shelf.

The support shelf of the battery receiver can comprise of a top surface on which the back portion of the battery unit is located and a front face perpendicular to the top surface with the center of gravity of the battery unit is forward of the front face of the support shelf. The vertical anchor can be in the back of the battery receiver and comprise of a latch mechanism that is configured to latch to a rod on the battery unit. The lateral anchor can be in the front face of the support shelf and comprise of a socket and plug configuration that attaches the battery unit to the chassis.

In an embodiment, the chassis can comprise of a support frame that supports an operating unit above the chassis. A front hood can be cantilevered to the operating unit and supported by the battery unit.

The battery unit can comprise of an electrical connector at the back portion of the battery unit configured to connect to a corresponding connector on the vehicle chassis to provide operating power to the vehicle. The front portion of the battery unit can have a bottom surface configured for supporting the weight of the battery unit so that it can be easily installed and removed from the chassis.

In an embodiment, the battery unit can comprise of a plurality of battery receptacles oriented in at least two horizontal rows for receiving a corresponding number of batteries therein. The front portion of the battery unit can be configured for holding more batteries than the back portion of the battery unit so that the center of gravity of the battery unit is at the front portion. The battery unit can also comprise of an electrical connector at the front portion of the battery unit configured to connect to a corresponding connector on a charging unit to allow charging batteries without having to separate the battery unit from the robotic vehicle.

In yet another embodiment, a robotic vehicle comprising a chassis comprising a support shelf and a support frame that extends above the support shelf is provided with a right track assembly and a left track assembly connected on opposite sides of the support shelf of the chassis for supporting the chassis. An operating unit is positioned on the support frame of the chassis and positioned above the support shelf of the chassis. A battery unit is positioned on the support shelf of the chassis. A front hood is cantilevered to the operating unit and supported from below by the battery unit.

In an embodiment, the battery unit is configured for connection to the chassis with the center of gravity of the battery unit is forward of the support shelf. A vertical anchor can be combined to the chassis for attachment to the battery unit such that the battery unit is cantilevered to the chassis with the center of gravity forward of the support shelf of the chassis. A lateral anchor can be combined to the chassis for attachment to the battery unit to restrict lateral movement of the battery unit with respect to the chassis.

In an embodiment, the battery unit can comprise of a plurality of battery receptacles oriented in at least two horizontal rows for receiving a corresponding number of batteries therein. The front portion of the battery unit can be configured for holding more batteries than the back portion of the battery unit so that the center of gravity of the battery unit is at the front portion.

BRIEF DESCRIPTION OF THE DRAWINGS

These features are among the advantages of the present invention. They will be better understood by reading the following detailed description, taken together with the drawings wherein.

DETAILED DESCRIPTION OF THE PREFERRED EMBODIMENTS

Figure 1:
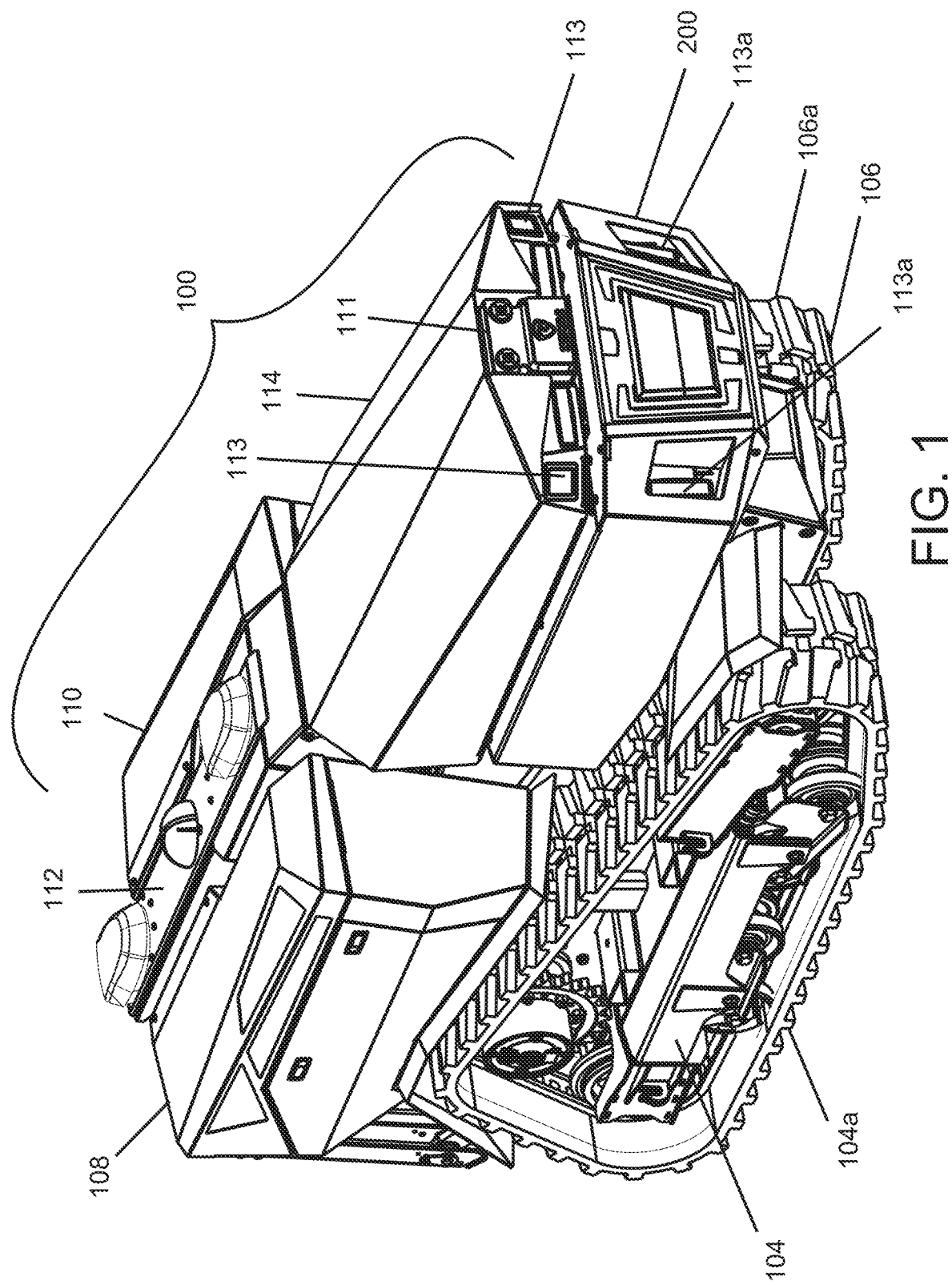
FIG. 1 is a perspective view of a robotic vehicle.
Figure 2:
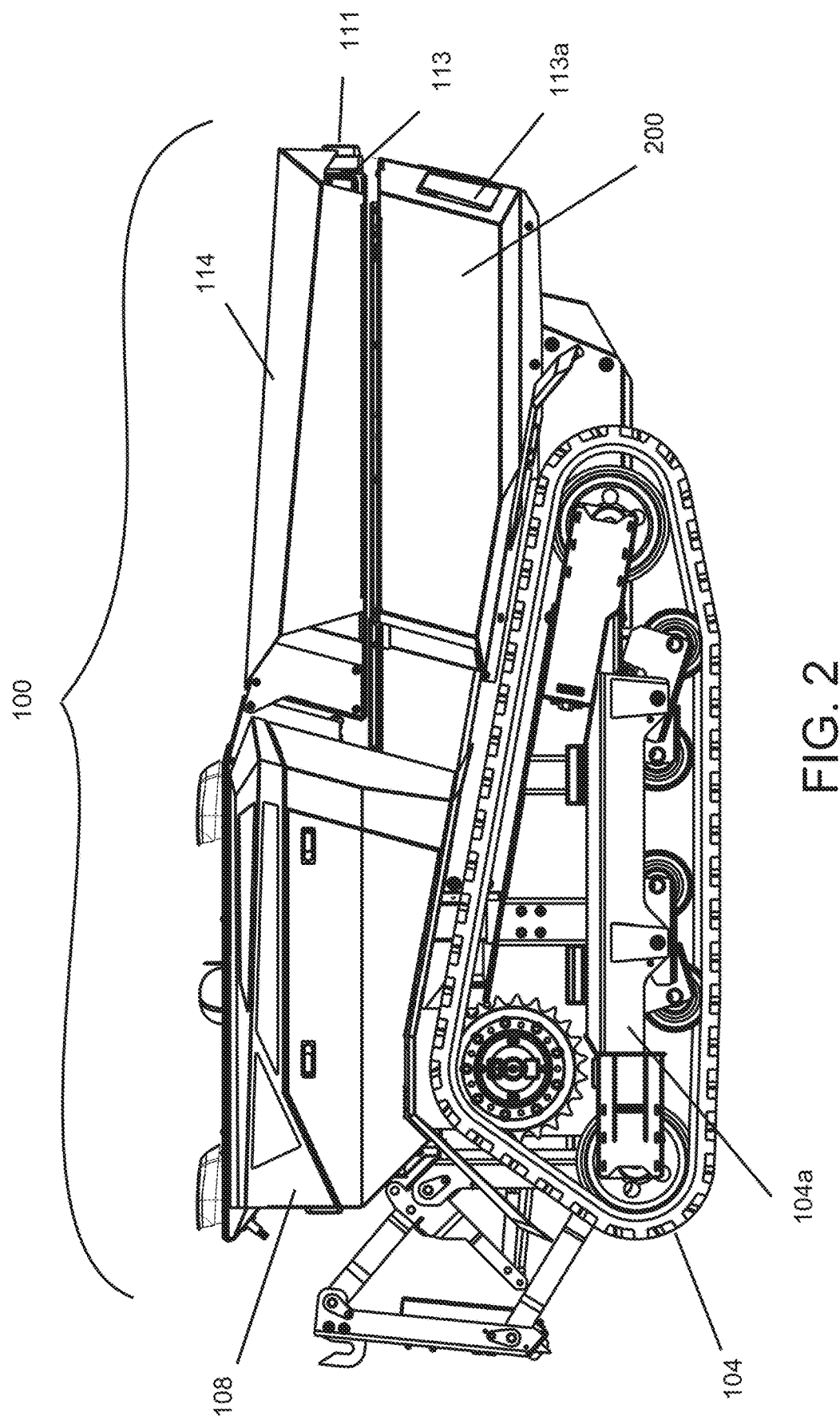
FIG. 2 is a side view of the robotic vehicle of FIG. 1.

Referring to FIGS. 1-2, a front perspective view and a side view of robotic vehicle 100 is disclosed. Robotic vehicle 100 is electric driven, and remotely operable, in order to carry out manpower-intensive or high-risk functions without exposing an operator to fatigue or hazard. Robotic vehicle 100 is robust and sturdy to operate in challenging environments. Its low, and forward center of gravity allows for towing or hauling equipment many times its weight. With an easily replaceable battery pack, robotic vehicle 100 can operate for many hours then quickly exchange battery packs for continued operation.

Robotic vehicle 100 comprises of a chassis 102 with a front end 102a and rear end 102b supported on a right track assembly 104 and a left track assembly 106 with a corresponding right track 104a and a left track 106a. A right motor driver 108 and a left motor driver 110 are provided for driving corresponding right track 104a and left track 106a. Right motor driver 108 and left motor driver 110 are connected together by an operating unit 112, where the circuitry and software necessary for operating robotic vehicle 100 is located. A front hood 114 projects outward from operating unit 112, right motor driver 108, and left motor driver 110 where ancillary equipment such as cameras 111 and lights 113 can be located.

Figure 3:
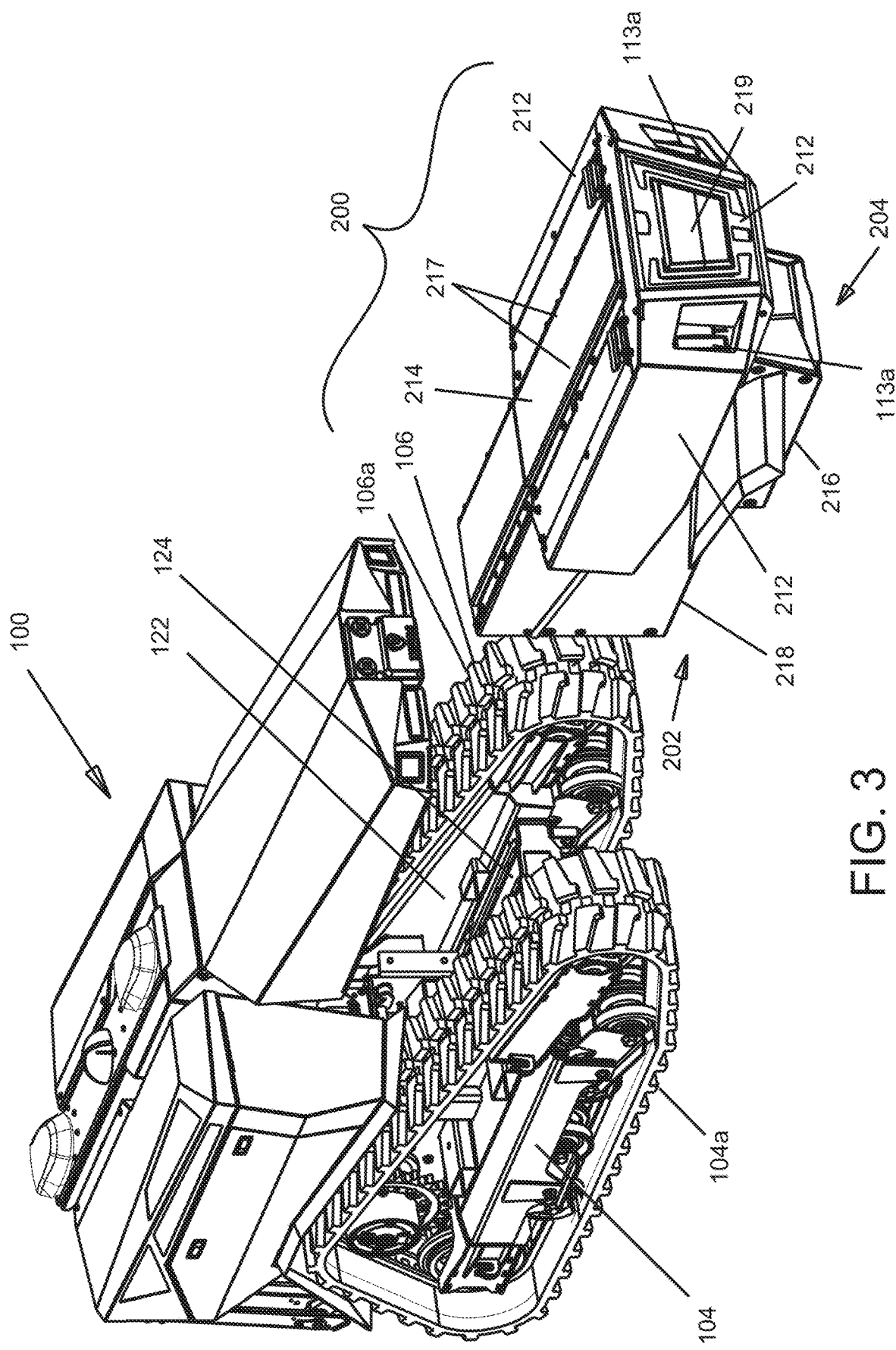
FIG. 3 is a perspective view of the robotic vehicle of FIG. 1 with the battery unit removed from the robotic vehicle.

Beneath front hood 114, on chassis 102, and between right track assembly 104, and left track assembly 106, is a battery unit 200. FIG. 3 shows battery unit 200 separated from robotic vehicle 100. Battery unit 200 may approach 25-30% of the total weight of robotic vehicle 100 weighing more than 1,500 pounds. By positioning battery unit 200 underneath front hood 114 on chassis 102, the center of gravity of robotic vehicle 100 is lowered and moved forward to improve traction and towing capacity.

Figure 4:
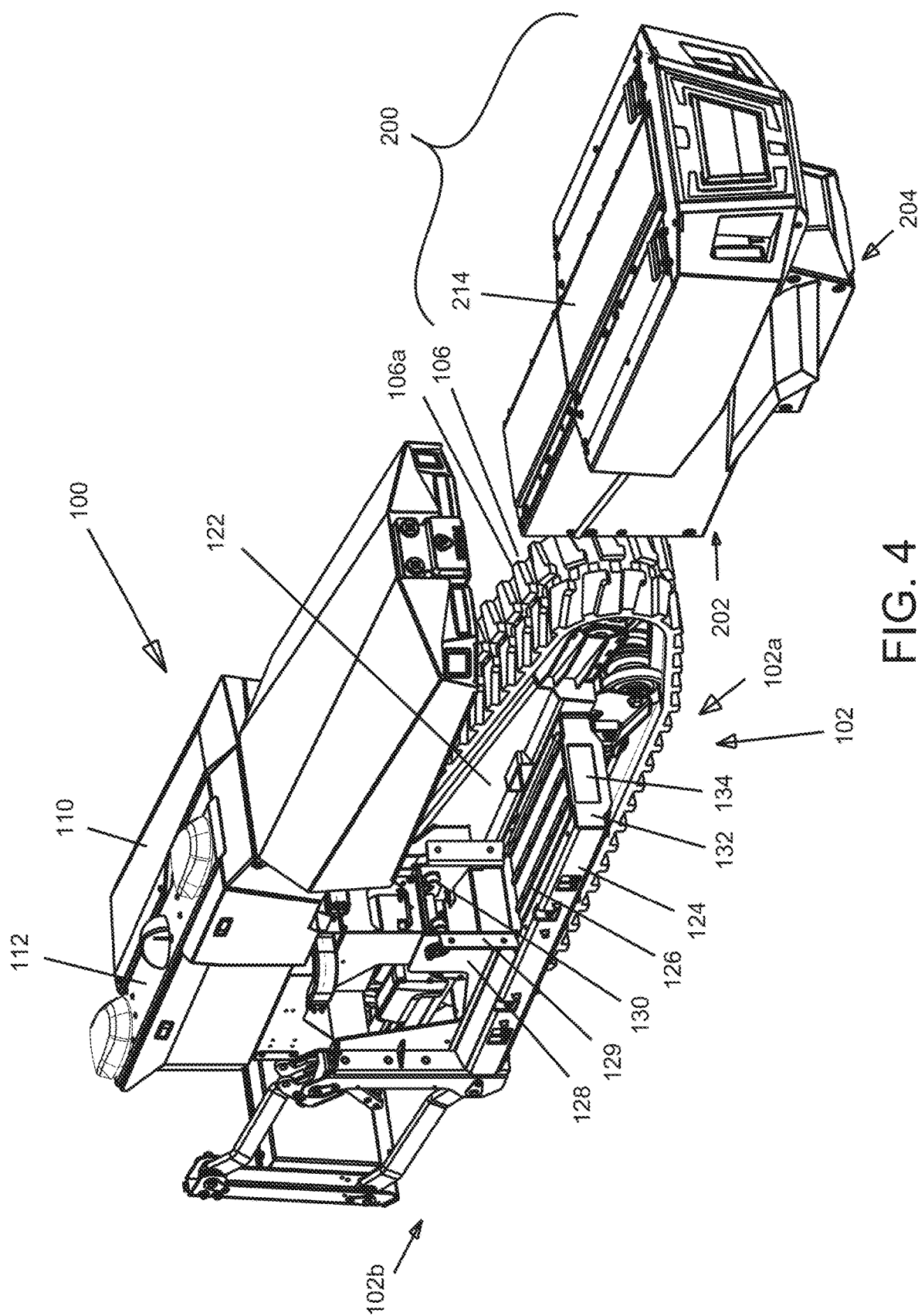
FIG. 4 is the perspective view of FIG. 3 with the right motor driver and right track assembly removed for clarity.
Figure 5:
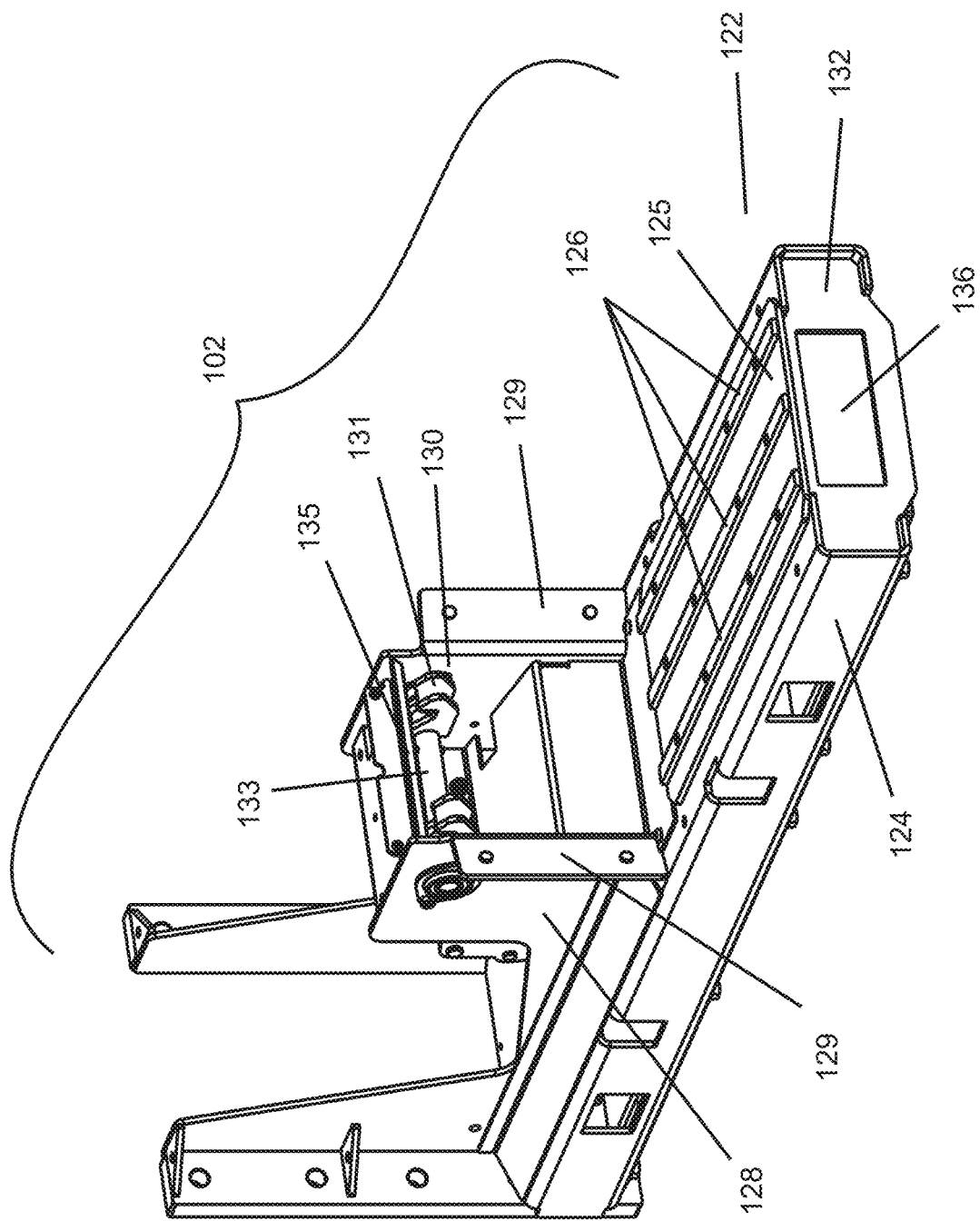
FIG. 5 is a perspective view of the chassis for the robotic vehicle of FIG. 1.

FIG. 4 shows the same view as FIG. 3, with right track assembly 104 removed to better illustrate chassis 102. The height of support shelf 124 relative to the bottom of left track 106a should be noted as providing robotic vehicle with good ground clearance for easy maneuverability through a field of various conditions. FIG. 5 shows chassis 102 removed from the vehicle. Chassis 102 comprises of a battery receiver 122 formed by a support shelf 124. A support frame 128 is positioned on top of support shelf 124 at the back end of battery receiver 122 to support operating unit 112 on chassis 102. Support frame 128 is appropriately fixed to chassis 102 in a manner to transfer moments from support frame 128 throughout chassis 102. Support frame 128 includes vertical guides 129 that are perpendicular to a top surface 125 of support shelf 124 of chassis 102. Wear pads 126 can be located on top surface 125 to protect support shelf 124 from wear as battery unit 200 is inserted and removed from battery receiver 122. Optional slots, rails, guide-ways, etc., can be added to guide battery unit 200 into battery receiver 122 by corresponding features on battery unit 200.

As seen in FIG. 5, support frame 128 can include a latch mechanism 130 between vertical guides 129. Latch mechanism 130 can include one or more latches 131 spaced apart by a rotating bar 133 that extends between sides of support frame 128. Rotating bar 133 can be located by bearings and manually operated to release battery unit 200 from battery receiver 122. An additional retention bar 135 can be added between sides of support frame 128 and above latch mechanism 130.

Figure 6:
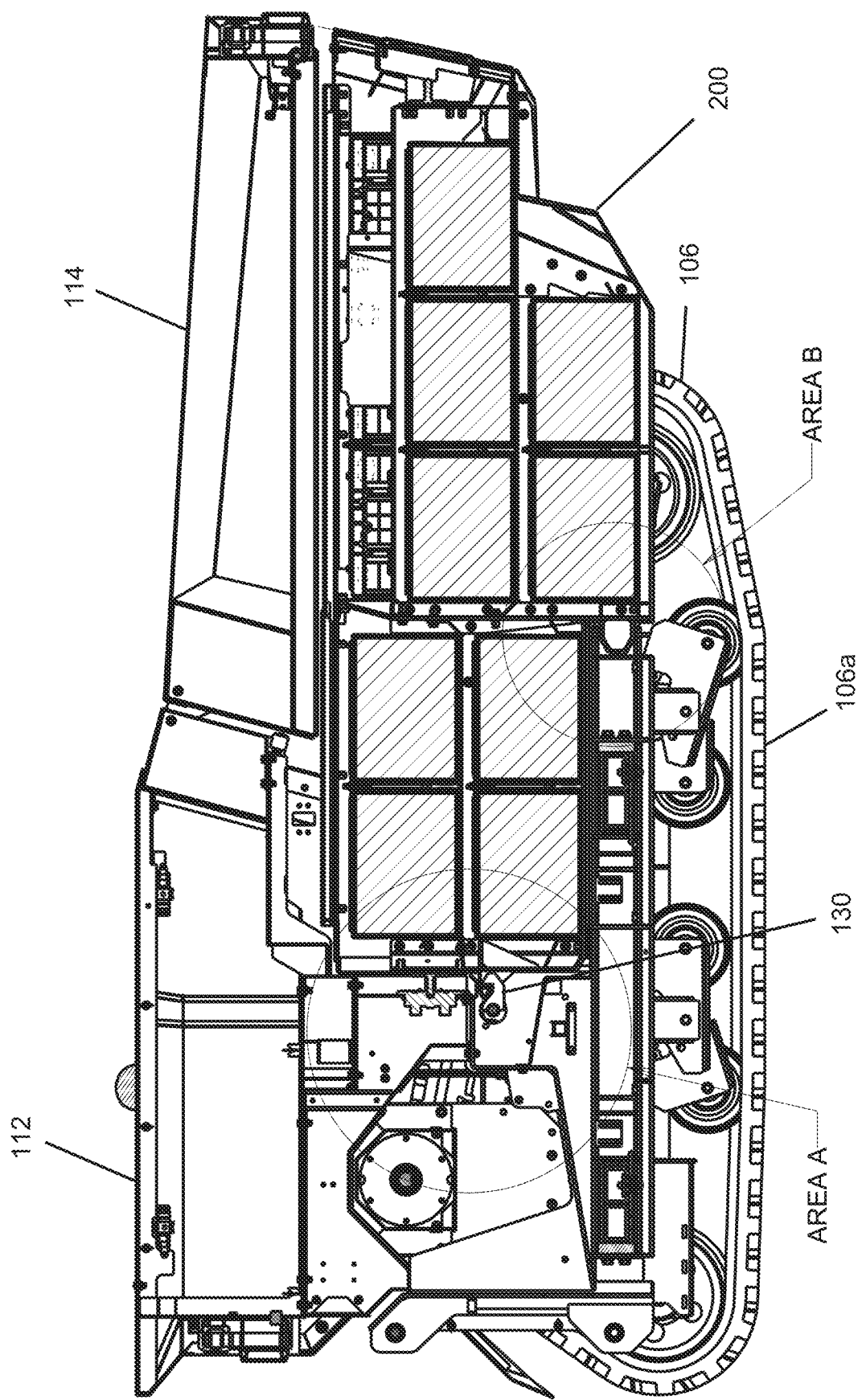
FIG. 6 is a side cross-section of the robotic vehicle of FIG. 1.
Figure 7:
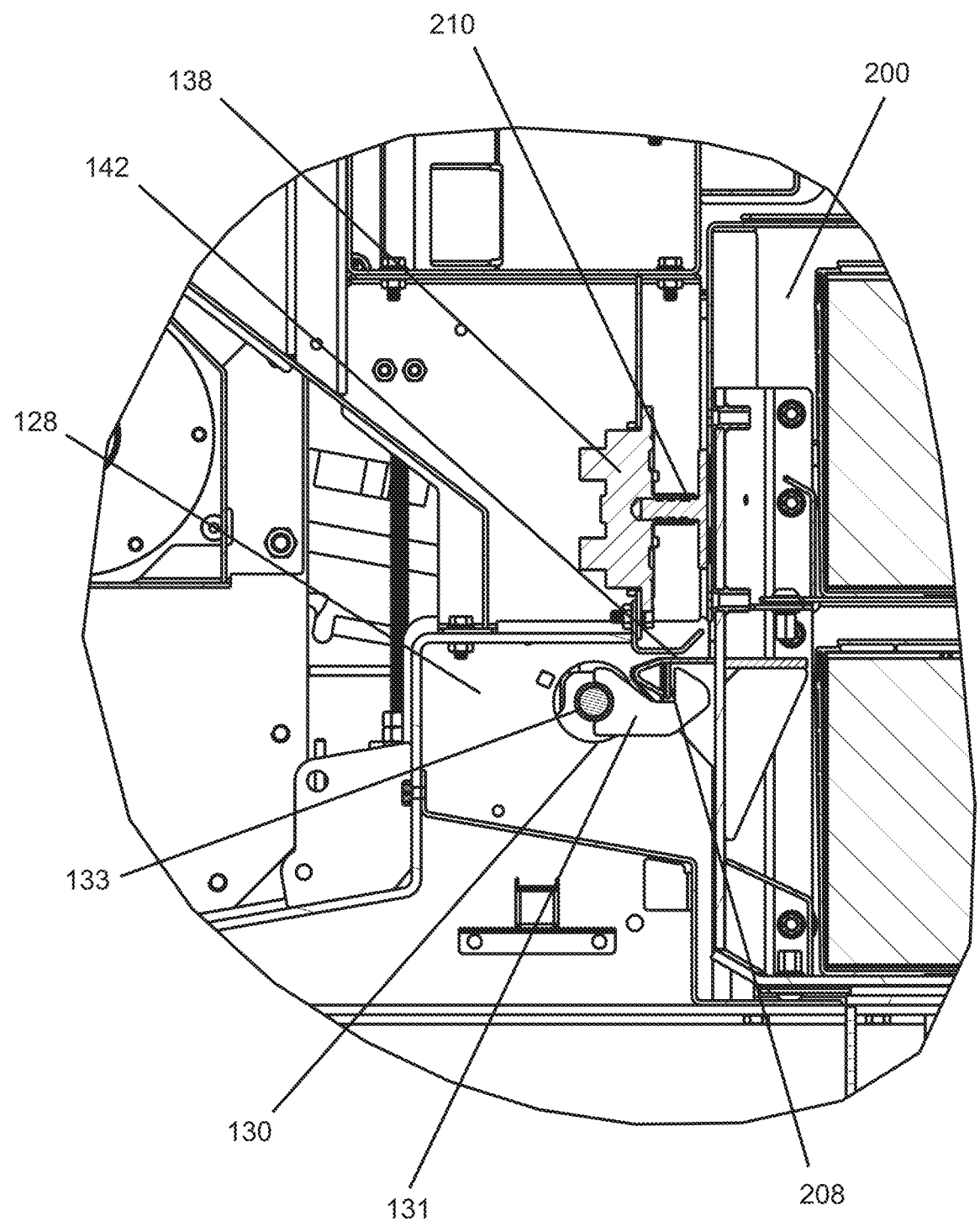
FIG. 7 is a close-up view of area A of FIG. 6.

FIG. 6 shows a left side cross-section view of the robotic vehicle 100 with the latch mechanism 130 shown in AREA A. FIG. 7 is a detailed view of the latch mechanism 130, used to secure the battery unit 200 to chassis 102. A vertical anchor 142 affixed to the battery unit 200 can be provided to prevent battery unit 200 from tipping forward, given that it is cantilevered in position with its center of gravity out front of support shelf 124 of battery receiver 122. Upward vertical motion of the battery unit 200 is transferred from the vertical anchor 142 to the retention bar 135 on the chassis 102. Vertical anchor 142 can be implemented with a rod 208 used to attach battery unit 200 to latch mechanism 130 of battery receiver 122.

Referring now to FIG. 6, It can be seen that support frame 128 supports operating unit 112 above battery unit 200. Operating unit 112 is cantilevered forward of support frame 128 so that front hood 114 must be supported by the top of battery unit 200.

Figure 9:
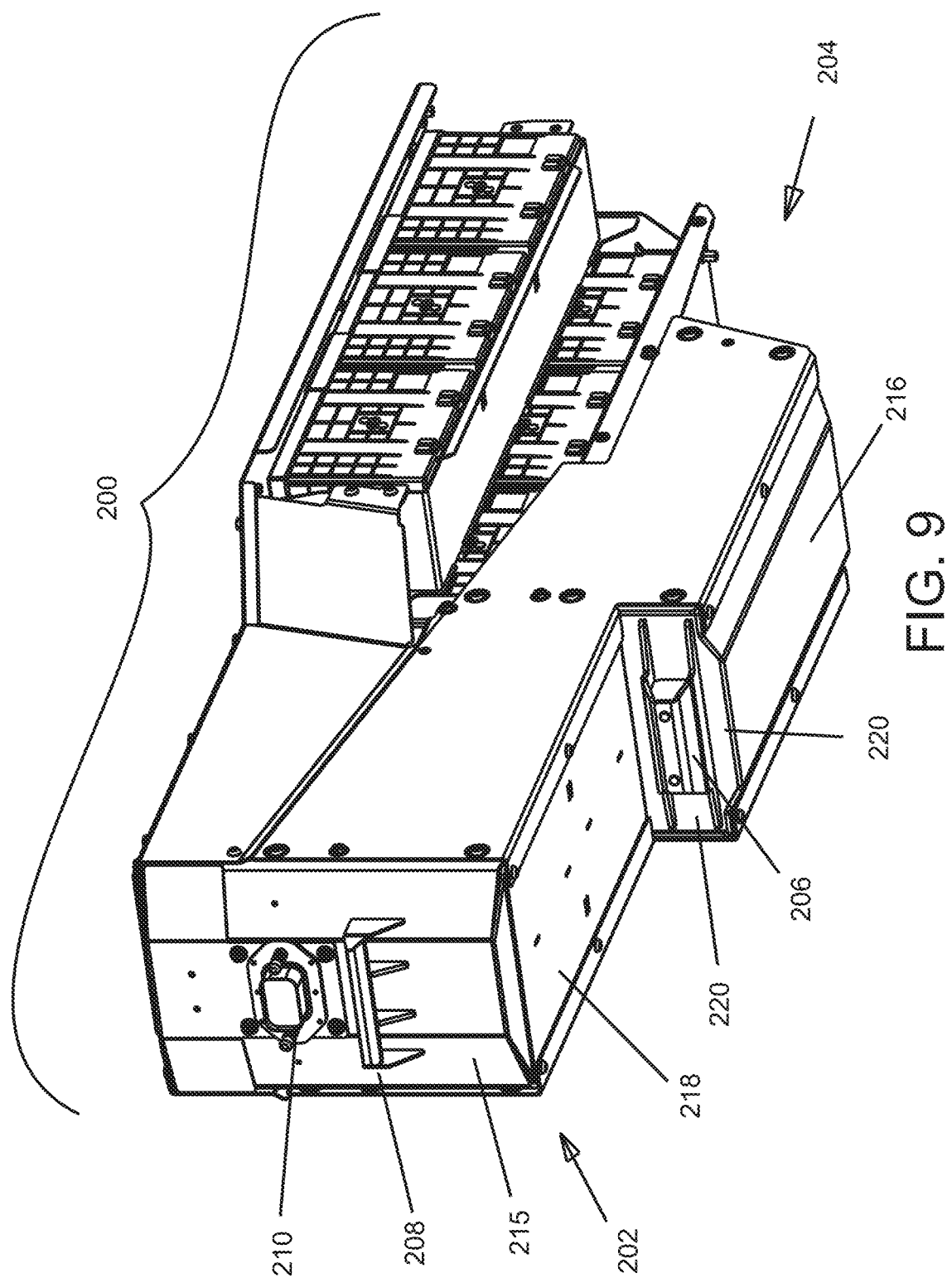
FIG. 9 is a back-side perspective view of the battery unit for the robotic vehicle of FIG. 1.

As can be seen from the illustrations, most notably FIG. 4 and FIG. 9, battery unit 200 comprises of a rear portion 202 and a front portion 204. Rear portion 202 of battery unit 200 is supported on support shelf 124 of battery receiver 122 while front portion 204 extends forward beyond any physically supporting area of battery receiver 122 such that it is cantilevered with its center of gravity forward of support shelf 124 of battery receiver 122 of chassis 102. In addition to moving the combined center of gravity of robotic vehicle forward, this configuration also improves the removability of the battery unit 200. A cart (not shown) can be placed under the center of gravity of battery unit 200 prior to releasing latch mechanism 130 at the rear of battery receiver 122 of chassis 102.

Figure 8:
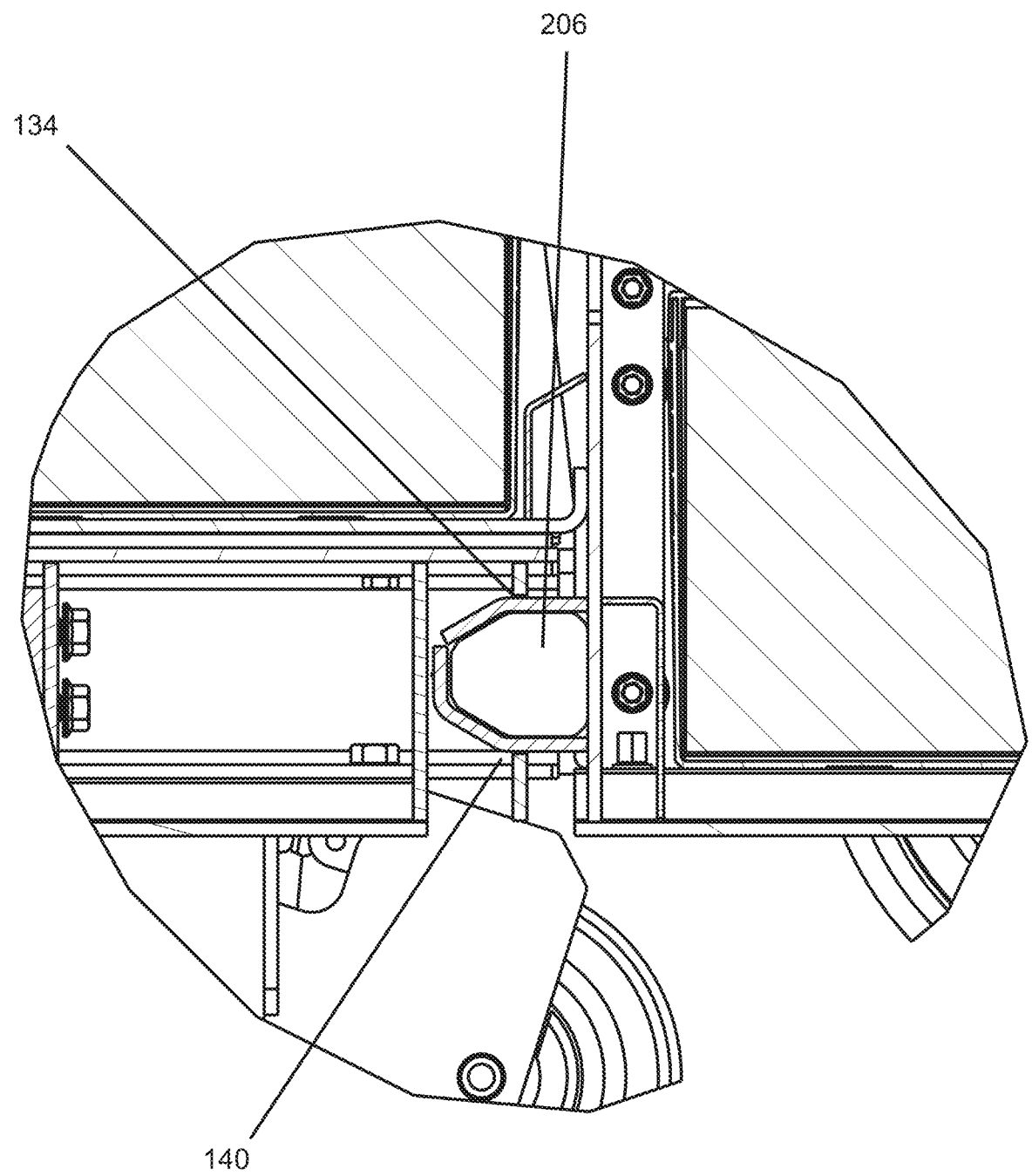
FIG. 8 is a close-up view of area B of FIG. 6.

AREA B of FIG. 6 shows the lateral anchor 140 provided to lock the battery unit 200 to battery receiver 122 of chassis 102. FIG. 8 show the details of the lateral anchor 140. Support shelf 124 comprises of a front face 132 that is perpendicular to top surface 125 of support shelf 124. Lateral anchor 140 can be implemented in front face 132 using a female socket 136 extending into support shelf 124. Female socket 136 is configured to receive a corresponding male plug 206 on battery unit 200. The connection of male plug 206 to female socket 136 forms lateral anchor 140 to retain battery unit 200 to chassis 102 in both the vertically and horizontal directions, but primarily restricts side-to-side, lateral motion of battery unit 200 in battery receiver 122 of chassis 102. Any side loading or moments on battery unit 200 while robotic vehicle 100 is in use is transferred to chassis 102. It should also be understood that male plug 206 can be replaced with a female socket and female socket 136 can be replaced with a male plug. In fact, any type of fastener assembly for connecting battery unit 200 to chassis 102 can be provided.

On support shelf 124 in the rear of battery receiver 122 of chassis 102 is an electrical connector 138, seen in FIG. 7 that corresponds with a mating electrical connector 210 on battery unit 200. This transfers power from battery unit 200 to operating unit 112 for distribution through robotic vehicle 100.

Figure 10:
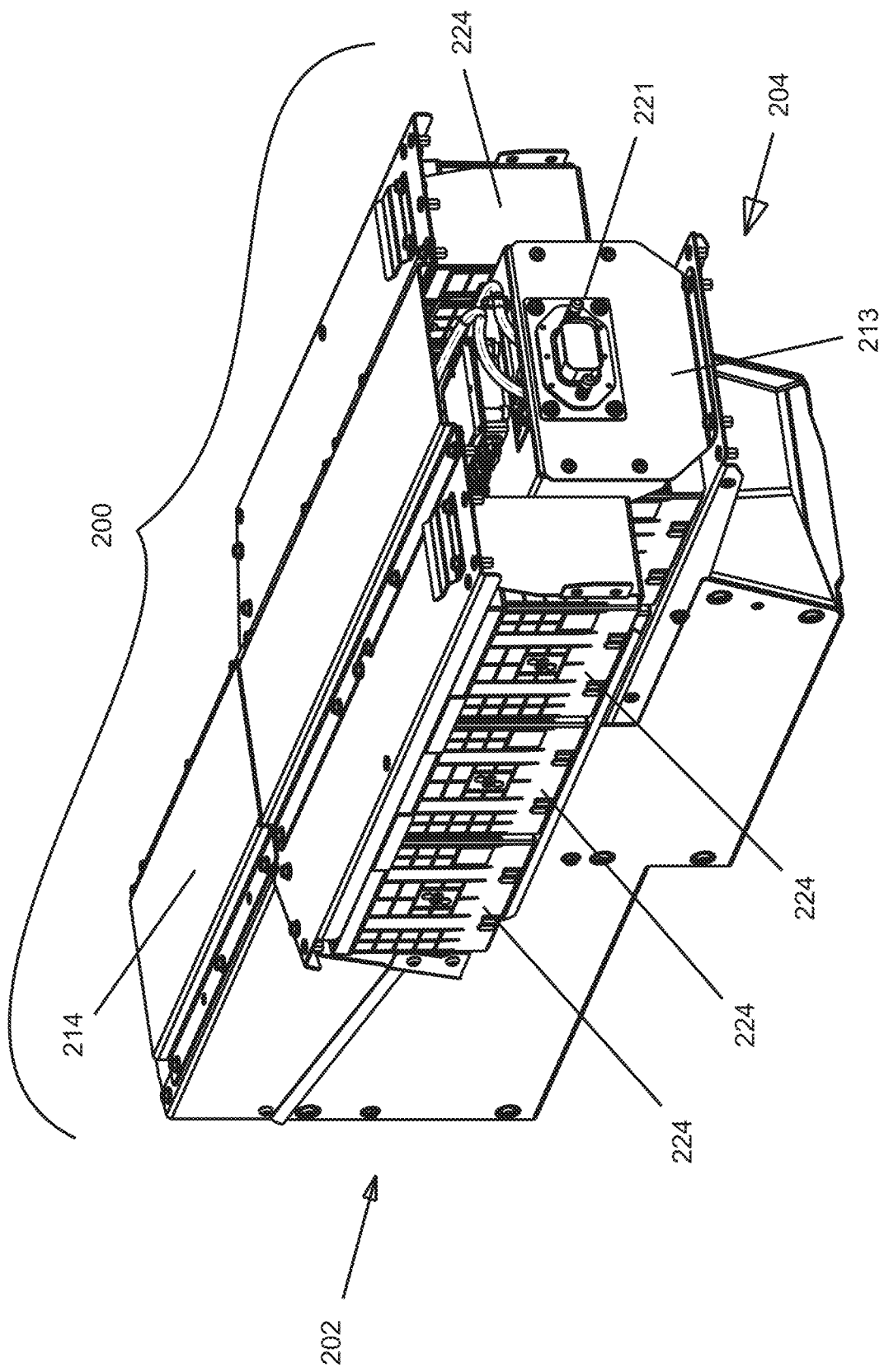
FIG. 10 is a front-side perspective view of the battery unit for the robotic vehicle of FIG. 1.

As illustrated in FIGS. 1-4, battery unit 200 comprises of a body 212 to give battery unit 200 an aesthetically pleasing appearance. Wear pads 217 can be provided on body 212 to protect battery unit 200 when it is inserted and removed from battery receiver 122 of chassis 102. On the front of body 212 is a door 219 that conceals a battery charging port 221, as best seen in FIG. 10, for charging battery unit 200 without having to remove battery unit 200 from battery receiver 122 of chassis 102 of robotic vehicle 100. Also, on the front of body 212 above and to the either side of door 219 are additional lights 113a.

Figure 11:
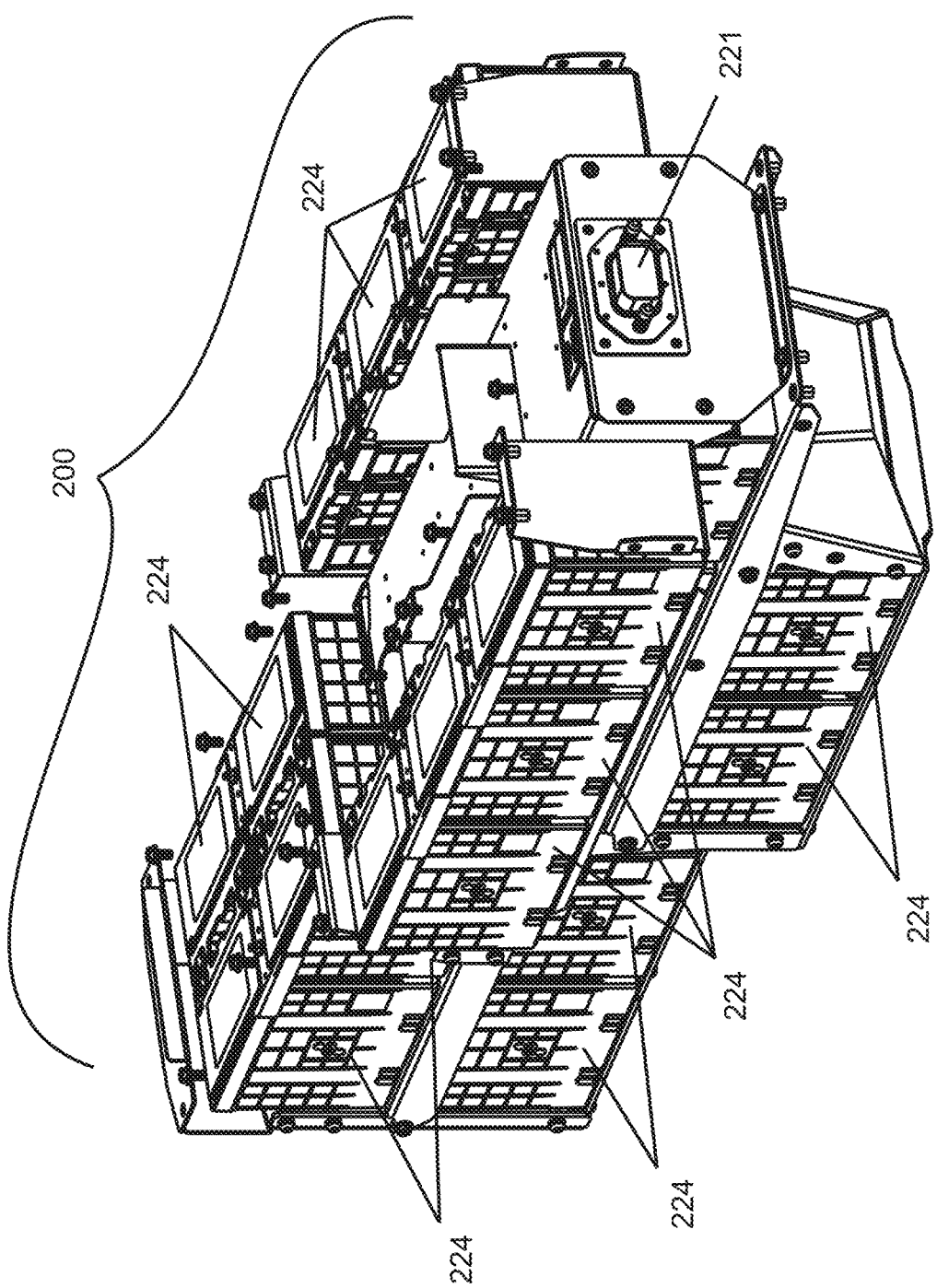
FIG. 11 is the perspective view of FIG. 10 with the side panels of the battery unit removed for clarity.

FIGS. 9-11 illustrate battery unit 200 with body 212 removed. Battery unit 200 is shaped with rear portion 202 and front portion 204 each in such a manner as to position the center of gravity of battery unit 200 in front portion 204 and forward of chassis 102 when located in battery receiver 122.

More specifically, battery unit 200 comprises of a top side 214 that is relatively flat so as to position battery unit 200 flush with the underside of front hood 114 of robotic vehicle 100. This flat surface of 214 supports front hood 114, which is cantilevered from operating unit 112. The substantially flat front bottom side, 216 as best seen in FIG. 9, provides a surface for a cart (not shown) to raise up against, in order to remove battery unit 200 from battery receiver 122. Parallel to surface 216 is the substantially flat second bottom side 218, which is offset upward from surface 216 to provide a location on which battery unit 200 can set on support shelf 124 of battery receiver 122.

As previously described, battery unit 200 utilizes a structural male plug 206. This is positioned on a vertical side 220 extending between first bottom side 216 and second bottom side 218. Battery unit 200 also comprises of rod 208 used to attach battery unit 200 to latch mechanism 130 of battery receiver 122, and electrical connector 210 to transfer power from battery unit 200 to operating unit 112 for distribution through robotic vehicle 100. Both rod 208 and electrical connector 210 are positioned on the back side, 215, of battery unit 200. On front side 213 is battery charging port 221 for charging battery unit 200, as described above.

Figure 12:
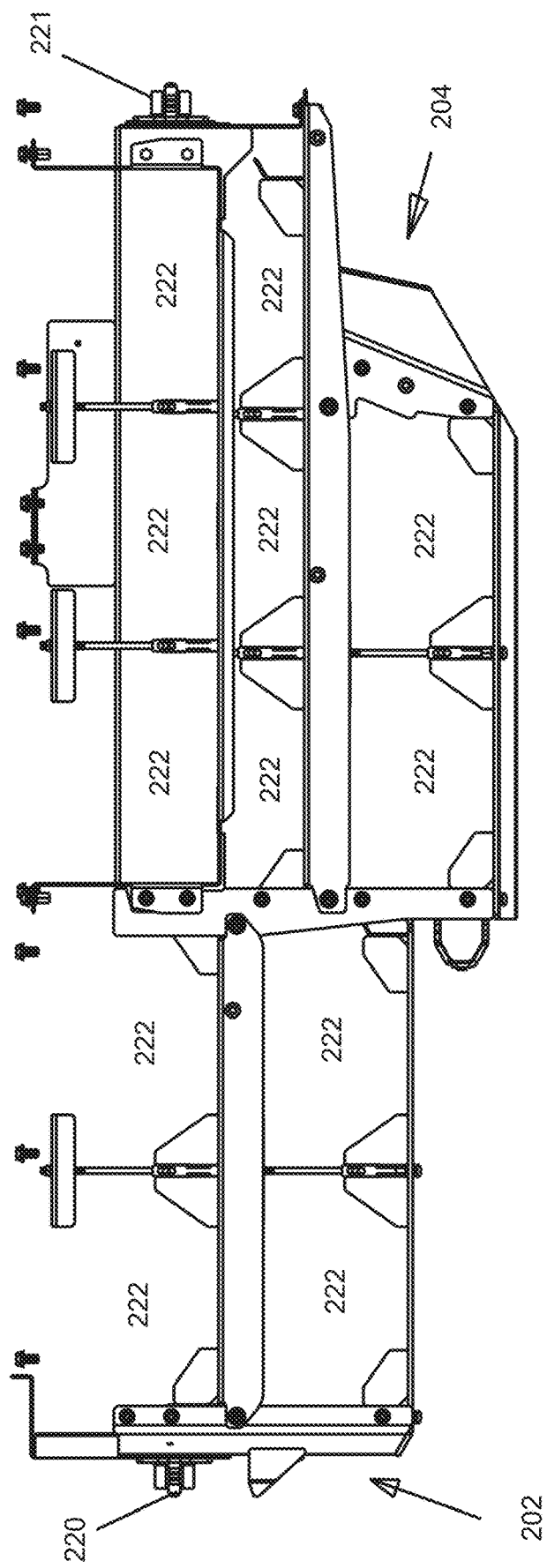
FIG. 12 is a side view of the battery unit of FIG. 1 with the side panels and the batteries removed for clarity.

Within the area described above are one or more battery receptacles 222 (seen in FIG. 12 with side panels and multiple batteries 224 removed). Each battery receptacle 222 is designed to receive a battery 224 (as shown in FIG. 11 with the side panels removed). Multiple batteries 224 are wired in parallel to create a battery set which is then wired in series with one or more other battery sets to provide long lasting power to robotic vehicle 100. In the illustrated embodiment, 24 batteries are connected together in two sets of 12 for a total voltage of 300 VDC. A control area network controller is used to control the voltage at electrical connector 210 and battery charging port 221. A battery management system can also be provided to monitor battery charge and to maintain proper dispensing of current. One skilled in the art will recognize that the number of batteries can be increased or decreased based on the charged power required by robotic vehicle 100. One skilled in the art will also recognize that advancements in battery technology will likely lead to a reduction in the number of batteries 224 required by battery unit 200. In this case, batteries can be replaced with weights to maintain the center of gravity.

The foregoing description shows a battery unit 200 cantilevered to the back of battery receiver 122 by vertical anchor 142 interfaced to retention bar 135. Because the center of gravity of battery unit 200 is in front portion 204 of battery unit 200, when battery unit 200 is installed in battery receiver 122, the center of gravity of robotic vehicle 100 is positioned forward of chassis 102 of robotic vehicle 100. By positioning the center of gravity out front of chassis 102, the traction of robotic vehicle 100 is greatly improved for towing farm implements. While towing, the loads on robotic vehicle 100 are very high, especially upon take off or acceleration. These high loads create a moment about the rear axle of robotic vehicle 100 which tends to lift the front of robotic vehicle 100. With the center of gravity out front of chassis 102, robotic vehicle stays firmly grounded.

Those skilled in the art will recognize that various assemblies, subassemblies, and elements herein described can be implemented in various arrangements. Assemblies can be divided into subassemblies, multiple subassemblies can be combined in single assemblies, and elements can be broken out of subassemblies and vice versa.

Words of inclusion used herein and the claims, such as "comprising", "having", and "including," are intended to have the same open-ended meaning.

While the principles of the invention have been described herein, it is to be understood by those skilled in the art that this description is made only by way of example and not as a limitation to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A robotic vehicle comprising:
   a chassis;
   a right track assembly and a left track assembly for supporting the chassis; and
   a battery unit comprising a front portion and a back portion with a center of gravity fixed at the front portion, wherein the battery unit is configured for connection to the chassis with the center of gravity fixed forward of the chassis.

2. The robotic vehicle of claim 1, further comprising a vertical anchor combined to the chassis for attachment to the battery unit such that the battery unit is cantilevered to the chassis with the center of gravity forward of the chassis.

3. The robotic vehicle of claim 2, further comprising a lateral anchor combined to the chassis for attachment to the battery unit to restrict lateral movement of the battery unit with respect to the chassis.

4. The robotic vehicle of claim 1, wherein the chassis further comprises a support frame that supports an operating unit above the chassis.

5. The robotic vehicle of claim 4, further comprising a front hood cantilevered to the operating unit and supported by the battery unit.

6. The robotic vehicle of claim 1, wherein the battery unit comprises an electrical connector at the back portion of the battery unit configured to connect to a corresponding connector on the vehicle chassis to provide operating power to the vehicle.

7. The robotic vehicle of claim 1, wherein the front portion of the battery unit has a bottom surface configured for supporting the weight of the battery unit so that it can be easily installed and removed from the chassis.

8. The robotic vehicle of claim 7, wherein the battery unit comprises a plurality of battery receptacles oriented in at least two horizontal rows for receiving a corresponding number of batteries therein.

9. The robotic vehicle of claim 8, wherein the front portion of the battery unit is configured for holding more batteries than the back portion of the battery unit so that the center of gravity of the battery unit is at the front portion.

10. The robotic vehicle of claim 1, wherein the battery unit comprises an electrical connector at the front portion of the battery unit configured to connect to a corresponding connector on a charging unit to allow charging batteries without having to separate the battery unit from the robotic vehicle.

11. A robotic vehicle comprising:
a chassis;
a right track assembly and a left track assembly for supporting the chassis; and
a battery unit comprising a front portion and a back portion with a center of gravity at the front portion, wherein the battery unit is configured for connection to the chassis with the center of gravity forward of the chassis,
wherein the chassis further comprises a battery receiver, wherein the battery receiver further comprises a support shelf between the right track assembly and the left track assembly for supporting a back portion of the battery unit, wherein the center of gravity of the battery unit is forward of the support shelf.

12. The robotic vehicle of claim 11, wherein the support shelf of the battery receiver comprises a top surface on which the back portion of the battery unit is located and a front face perpendicular to the top surface, and wherein the center of gravity of the battery unit is forward of the front face of the support shelf.

13. The robotic vehicle of claim 12, further comprising a vertical anchor combined to the chassis for attachment to the battery unit such that the battery unit is cantilevered to the chassis with the center of gravity forward of the chassis, wherein the vertical anchor is in the back of the battery receiver and the lateral anchor is in the front face of the support shelf.

14. The robotic vehicle of claim 13, wherein the vertical anchor comprises a latch mechanism that is configured to latch to a rod on the battery unit.

15. The robotic vehicle of claim 13, further comprising a lateral anchor combined to the chassis for attachment to the battery unit to restrict lateral movement of the battery unit with respect to the chassis, wherein the lateral anchor comprises a socket and plug configuration that attaches the battery unit to the chassis.

16. The robotic vehicle of claim 15, wherein the lateral anchor comprises a female socket in the front face of the support shelf, and the battery unit further comprises of a male plug for attaching the battery unit to the chassis.

17. A robotic vehicle comprising:
a chassis comprising a support shelf and a support frame that extends above the support shelf;
a right track assembly and a left track assembly connected on opposite sides of the support shelf of the chassis for supporting the chassis;
an operating unit positioned on the support frame of the chassis and positioned above the support shelf of the chassis;
a battery unit positioned on the support shelf of the chassis; and
a front hood cantilevered to the operating unit and supported from below by the battery unit.

18. The robotic vehicle of claim 17, wherein the battery unit is configured for connection to the chassis with the center of gravity of the battery unit forward of the support shelf.

19. The robotic vehicle of claim 18, further comprising: a vertical anchor combined to the chassis for attachment to the battery unit such that the battery unit is cantilevered to the chassis with the center of gravity forward of the support shelf of the chassis; and a lateral anchor combined to the chassis for attachment to the battery unit to restrict lateral movement of the battery unit with respect to the chassis.

20. The robotic vehicle of claim 19, wherein the battery unit comprises a plurality of battery receptacles oriented in at least two horizontal rows for receiving a corresponding number of batteries therein, wherein a front portion of the battery unit is configured for holding more batteries than a back portion of the battery unit so that the center of gravity of the battery unit is at the front portion.

* * * * *